US008755084B2

(12) United States Patent
Iinuma

(10) Patent No.: US 8,755,084 B2
(45) Date of Patent: Jun. 17, 2014

(54) IMAGE FORMING APPARATUS, CONTROL METHOD, AND MEDIUM FOR PERFORMING PRINTING WITH A TRANSPARENT RECORDING AGENT

(75) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/418,866

(22) Filed: Mar. 13, 2012

(65) Prior Publication Data
US 2012/0236335 A1 Sep. 20, 2012

(30) Foreign Application Priority Data

Mar. 16, 2011 (JP) ................. 2011-058104

(51) Int. Cl.
 *G06F 15/00* (2006.01)
 *G06K 1/00* (2006.01)
 *H04N 1/60* (2006.01)
 *G06K 15/02* (2006.01)
 *H04N 1/54* (2006.01)

(52) U.S. Cl.
 CPC ............... *G06K 15/02* (2013.01); *H04N 1/54* (2013.01); *H04N 1/6027* (2013.01)
 USPC ............................. 358/1.9; 358/3.1

(58) Field of Classification Search
 CPC ............... G06K 15/02; H04N 1/6027
 USPC ........................ 358/1.1, 1.9, 1.13, 3.1
 See application file for complete search history.

(56) References Cited

U.S. PATENT DOCUMENTS 5,841,897 A * 11/1998 Numakura et al. ........... 382/163
7,933,545 B2 * 4/2011 Hryhorenko et al. ......... 399/341

FOREIGN PATENT DOCUMENTS

JP 2008-145595 A 6/2008
JP 2009-265405 A 11/2009

* cited by examiner

*Primary Examiner* — Douglas Tran
(74) *Attorney, Agent, or Firm* — Canon USA Inc. IP Division

(57) ABSTRACT

An image forming apparatus includes a determination unit configured to determine whether printing is designated to be performed using a transparent recording agent with respect to an area to be printed with a color recording agent having a density lower than a threshold among areas included in input image data, and a printing unit configured to perform printing by transferring the color recording agent and the transparent recording agent to a sheet and fixing the color recording agent and the transparent recording agent to the sheet by a single fixing process to form an image of the area if the determination unit determines that the printing is designated to be performed using the transparent recording agent with respect to the area to be printed with the color recording agent having the density lower than the threshold.

17 Claims, 15 Drawing Sheets

FIG. 15

TRANSPARENT TONER PRINT PRIORITY ITEMS

PLEASE SELECT PRIORITY REGARDING OUTPUT METHOD
OF APPARATUS FOR PRINTING TRANSPARENT TONER.

| SPEED | IMAGE QUALITY |
|---|---|
| 1501 | 1502 |

IMAGE FORMING APPARATUS, CONTROL METHOD, AND MEDIUM FOR PERFORMING PRINTING WITH A TRANSPARENT RECORDING AGENT

BACKGROUND OF THE INVENTION

1. Field of the Invention

The present invention relates to an image forming apparatus which performs printing with a transparent recording agent serving as a spot color recording agent.

2. Description of the Related Art

Recently, an image processing apparatus capable of printing with a transparent toner (i.e., clear toner) has been discussed. The transparent toner is one of the spot color recording agents.

A whole surface coating is obtained by printing a transparent toner on an entire printable area of a print sheet. Such a whole surface coating can provide the entire sheet surface with glossiness like a photograph by printing the sheet with color toners such as cyan, magenta, yellow, and black (CMYK) toners and then printing the entire sheet with the transparent toner. A partial coating, on the other hand, is obtained when a print sheet is printed with color toners, and then a designated area in a printable area of the print sheet is printed with a transparent toner. The partial coating can provide the sheet with partial glossiness or a partial decoration effect. When such a transparent toner is used in printing, therefore, various expressions can be obtained, thereby generating a value-added output product.

Further, so as to perform printing with the transparent toner, an image processing apparatus may include a mechanism for fixing color toner images and a transparent toner image onto a sheet in a single fixing process, after CMYK toners serving as color toners and a transparent toner are transferred to the sheet. Accordingly, the image processing apparatus can generate an output product using the transparent toner.

However, the addition of such a mechanism for printing with the transparent toner may cause, for example, a problem of a loaded amount of the toner. More specifically, the image processing apparatus has limitation on a toner amount, which can be fixed at a single fixing process in per unit area of a print target sheet (limitation on loaded amount). Consequently, an area in need of a large amount of color toners cannot be provided with a sufficient amount of the transparent toner to suppress a toner amount within the limitation of loaded amount.

Accordingly, Japanese Patent Application Laid-Open No. 2008-145595 discusses an image processing system for generating an output product using a transparent toner by connecting an image processing apparatus that uses color toners in printing and an image processing apparatus that uses a transparent toner in printing. For example, a user who uses a transparent toner is offered to use an image processing system in which an image processing apparatus in a previous stage is connected to another image processing apparatus in a latter stage. The image processing apparatus of the previous stage performs printing by transferring and fixing color toners, whereas the image processing apparatus of the latter stage performs printing by transferring and fixing a transparent toner. According to such a configuration, both of the color toners and the transparent toner can be used sufficiently with respect to a print target.

In addition, effects on output products can be varied depending on types of print sheets to be used. For example, use of a transparent toner does not always provide an output product surface with the glossy expression, and there are cases where a surface of an output product can have a matte expression by using the transparent toner. In other words, when a transparent toner is used, a surface texture of an output product can be changed. The glossy expression attained with use of the transparent toner is referred to as a "gloss effect", whereas the matte expression is referred to as a "matte effect". These two effects are referred to as "effects relating to glossiness". A user needs to perform complicated settings at the time of printing to obtain such effects. The complicated settings, for example, include selection of a sheet type to be used in printing and selection of a printing method of a transparent toner. Consequently, the user has a difficulty in dealing with the settings.

Japanese Patent Application Laid-Open No. 2009-265405 discusses an image processing apparatus capable of automatically selecting a sheet type and a printing method when a user sets an effect relating to glossiness to be expressed on a desired area on a print sheet.

An effect attained with use of the transparent toner is not limited to the above-described effect relating to glossiness. For example, when a transparent toner is printed on an area with color toners printed thereon, the print area can be finished with a pearl tone. An effect for adding such a pearl tone finish to a printing area using the transparent toner is referred to as a pearl effect. The pearl effect is obtained when the transparent toner is added to an area in which a color toner having a low density is printed.

As described above, the transparent toner can be printed by two methods, a printing method for fixing color toner images and a transparent toner image on a sheet in a single fixing process, and a printing method for fixing color toner images on a sheet and then fixing a transparent toner image on the sheet.

Compared to these two methods, the printing method, which can fix the color toner images and the transparent toner image at once, can equally apply heat to the transparent toner image and the color toner images, so that the toners are well mixed. When a pearl effect is to be obtained, it is desirable that color toners and a transparent toner may be uniformly mixed. In other words, the color toners and the transparent toner may be fixed together at once to obtain the pearl effect.

When the transparent toner is used in printing to express the pearl effect, therefore, a density of the color toners serving as background of the transparent toner and a fixing method at the time of printing of the transparent toner need to be considered. Moreover, it may be a heavy burden for a user to perform settings for realizing the pearl effect.

SUMMARY OF THE INVENTION

According to an aspect of the present invention, an image forming apparatus includes a determination unit configured to determine whether printing is designated to be performed using a transparent recording agent with respect to an area to be printed with a color recording agent having a density lower than a threshold among areas included in input image data, and a printing unit configured to perform printing by transferring the color recording agent and the transparent recording agent to a sheet and fixing the color recording agent and the transparent recording agent to the sheet by a single fixing process to form an image of the area if the determination unit determines that the printing is designated to be performed using the transparent recording agent with respect to the area to be printed with the color recording agent having the density lower than the threshold.

According to the present invention, when a transparent recording agent is used in printing, a user can perform printing that can express a pearl effect in an area where the pearl effect can be obtained on a print product without consideration a print setting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 illustrates another example of a screen to be displayed on the UI screen.

DESCRIPTION OF THE EMBODIMENTS

Various exemplary embodiments, features, and aspects of the invention will be described in detail below with reference to the drawings.

A first exemplary embodiment describes a method for automatically determining an area expected to have a pearl effect on a sheet used in printing, and controlling such that the pearl effect can be maximized in the area on the sheet when printing is performed by a present print system. In the description, toner is used as an example of a recording agent in electrophotographic printing. However, the recording agent is not limited to toner. Alternatively, ink may be used.

[Brief Description of Entire Configuration]

Figure 1:
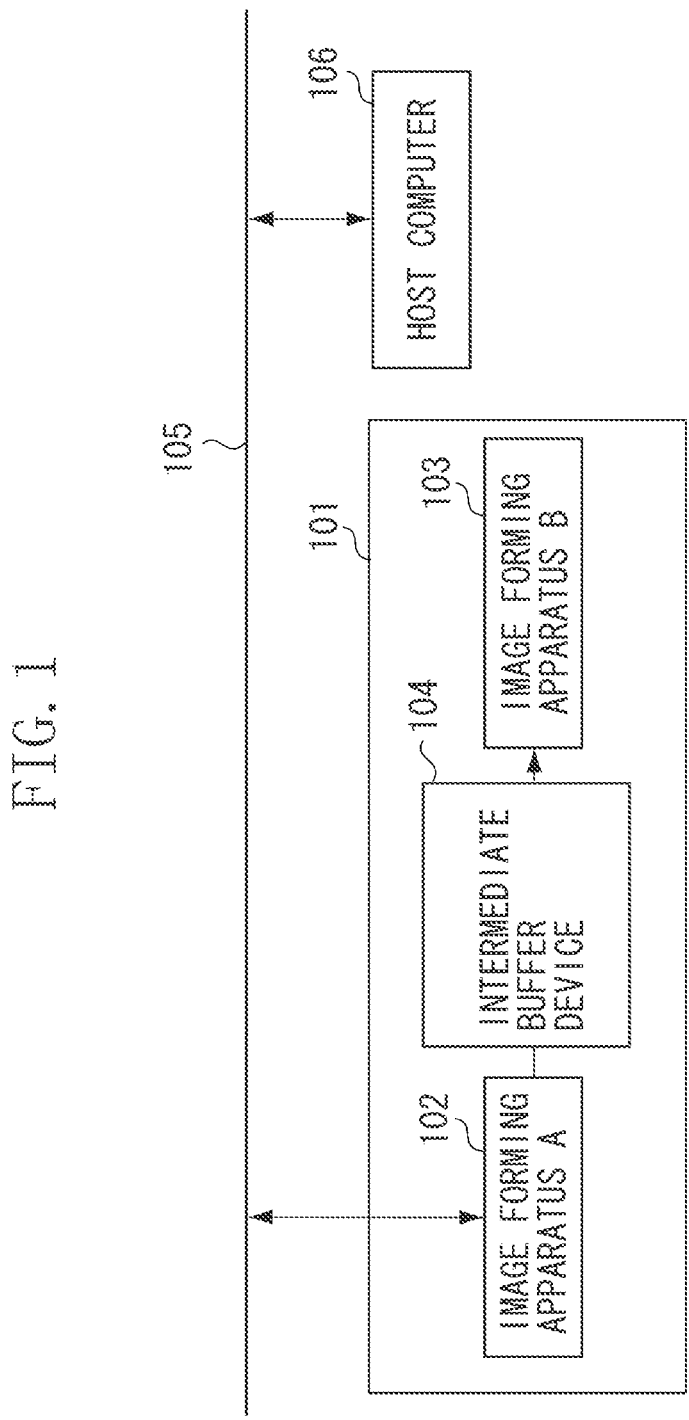
FIG. 1 illustrates a configuration of a print system according to an exemplary embodiment of the present invention.

FIG. 1 illustrates an entire configuration of a print system 101 according to the present exemplary embodiment.

Figure 2:
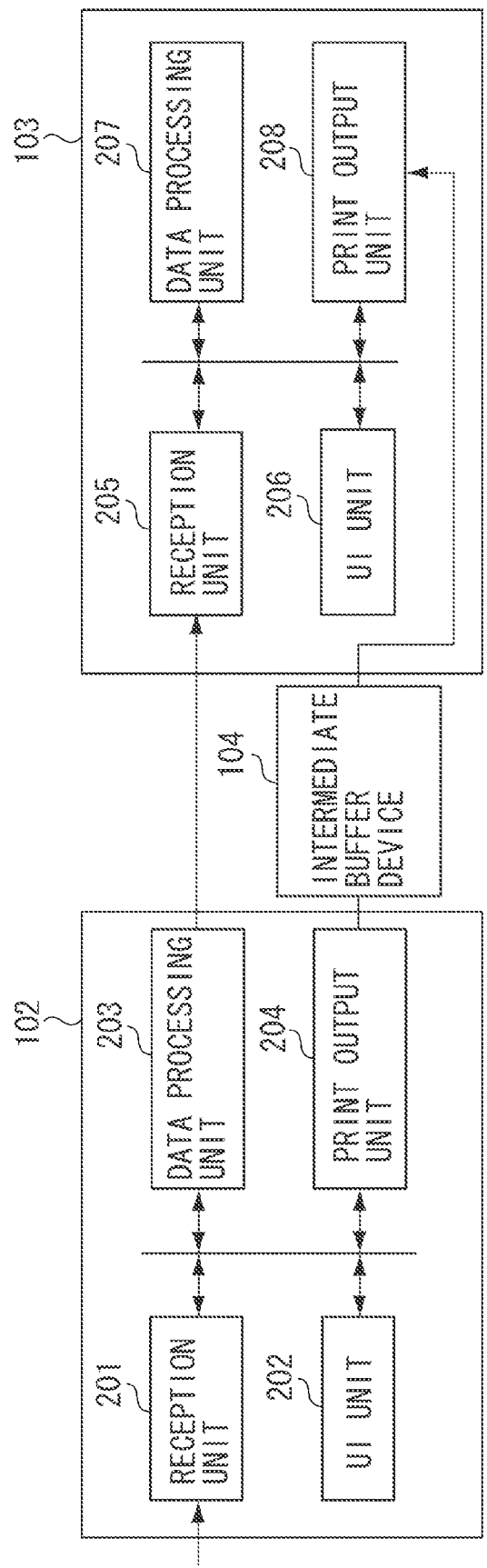
FIG. 2 illustrates a system configuration.

FIG. 2 is a configuration diagram illustrating an image forming apparatus A 102 (a first image forming apparatus), an image forming apparatus B 103 (a second image forming apparatus), and an intermediate buffer device 104 which realize the print system 101. The image forming apparatus A 102 is connected to the image forming apparatus B 103 via the intermediate buffer device 104.

Figure 4:
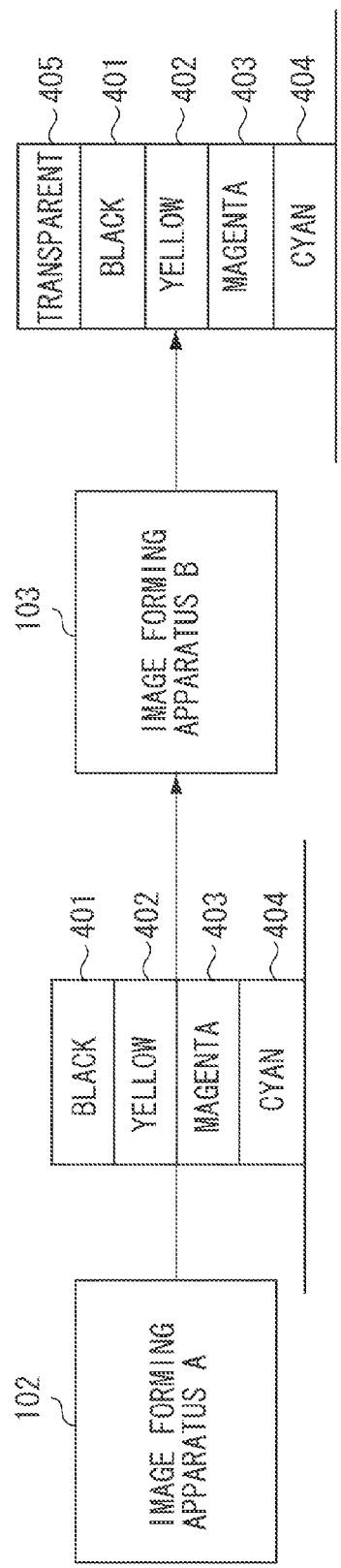
FIG. 4 illustrates a load of toner at the time of printing according to the present print system.
Figure 5:
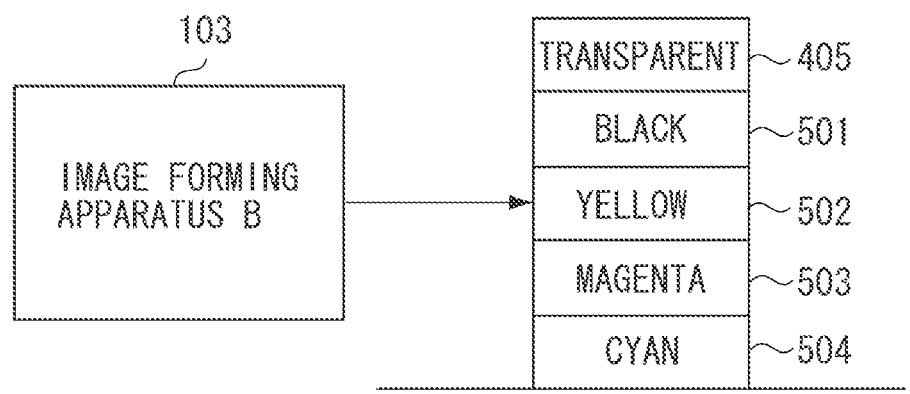
FIG. 5 illustrates a load of toner at the time of printing according to an image forming apparatus B.

FIGS. 4 and 5 each illustrate an arrangement of toners to be applied on a sheet when printing is performed.

The print system 101 includes the image forming apparatus A 102 to which a sheet is first supplied, and the image forming apparatus B 103 which receives the sheet conveyed from the image forming apparatus A 102. In other words, the sheet is conveyed from a sheet discharge unit of the image forming apparatus A 102 to a sheet feeding unit of the image forming apparatus B 103. The intermediate buffer device 104 is disposed between the image forming apparatus A 102 and the image forming apparatus B 103. The intermediate buffer device 104 temporarily stores a sheet therein between the image forming apparatuses. If a difference in printing speed occurs between the image forming apparatuses A 102 and B 103, the intermediate buffer device 104 can reduce or eliminate the difference.

More specifically, sheets printed by the image forming apparatus A 102 are sequentially stacked in the intermediate buffer device 104. The image forming apparatus B 103 needs to pull out a bottommost sheet from the plurality of sheets stacked in the intermediate buffer device 104 when the sheet is fed. Consequently, a sheet jam or a print order inconsistency can occur if the image forming apparatus B 103 fails to feed the sheet. Therefore, the intermediate buffer device 104 controls a sheet discharge timing and a sheet feed timing as follows.

When the image forming apparatus A 102 finishes printing, a sheet is discharged to the sheet discharge unit thereof and conveyed to the intermediate buffer device 104. The image forming apparatus B 103 feeds thereto the sheet stacked on the intermediate buffer device 104 before a new sheet is discharged to the intermediate buffer device 104 when the image forming apparatus A 102 finishes the printing of the new sheet. Thus, a plurality of sheets is not stacked on the intermediate buffer device 104, and the sheet is conveyed from the image forming apparatus A 102 to the image forming apparatus B 103. A plurality of sheets may be stacked on the intermediate buffer device 104 if the image forming apparatus B 103 can readily pull out a bottommost sheet from the stacked sheets.

In the print system 101, therefore, the sheet is conveyed through the two image forming apparatuses A 102 and B 103 as illustrated in FIG. 4. The image forming apparatus A 102 transfers CMYK toners 401 through 404 serving as color recording agents to a sheet, fixes the transferred toners on the sheet, and discharges the printed sheet. Subsequently, the discharged printed sheet is fed to the image forming apparatus B 103, so that the image forming apparatus B 103 transfers a transparent toner 405 on the printed sheet and again fixes the transparent toner 405 on the sheet in printing.

As illustrated in FIG. 5, the image forming apparatus B 103 alone can transfer five toners such as CMYK toners 501 through 504 and the transparent toner 405 serving as a transparent recording agent to a sheet, and fix the five toners on the sheet at once to print color toner images and a transparent toner image on the sheet.

Such a printing method as illustrated in FIG. 5 is hereinafter referred to as "1-pass printing (first printing)" in which color toners and a transparent toner are transferred to a sheet and then are fixed on the sheet at once.

On the other hand, a printing method as illustrated in FIG. 4 is referred to as "2-pass printing (second printing)" in which the image forming apparatus A 102 transfers and fixes color toners onto a sheet, and then the image forming apparatus B 103 transfers and fixes a transparent toner onto the sheet again.

It is assumed that the print system 101 performs printing according to a print instruction from a host computer 106 via a network 105.

[Print Instruction Method of Transparent Toner]

A process using a named profile is described as an example of an instruction for a transparent toner print position. When a specific character string is used in an application side at the time of input color designation, a named profile corresponding to the character string is selected. Hereinafter, the process using the "named profile" in a data format is described. When an application is used to associate a specific character string with a certain input color, a named profile corresponding to the specific character string is selected.

Accordingly, when a driver of the host computer 106 associates a specific character string with a transparent toner, a named profile corresponding to the character string is selected, so that a transparent toner selection instruction can be issued to a portion in which the transparent toner is desired to be printed. More specifically, when the driver of the host computer 106 designates use of the transparent toner to the character string, the transparent toner print position can be instructed.

According to the present exemplary embodiment, the named profile is used to instruct a position to be printed with a transparent toner, but the present exemplary embodiment is not limited to this configuration. Any print instruction method can be applied as long as an image forming apparatus can receive an instruction for a position to be printed with a transparent toner.

[Pearl Effect]

When a transparent toner is printed on an area with color toners printed thereon, the print area can be finished with a pearl tone (metallic glossiness can be expressed). Such a pearl tone obtained by using a transparent toner is referred to as a pearl effect.

Such a pearl effect is often observed in an area in which a low density color toner and a transparent toner are superimposed. In the present exemplary embodiment, assume that a pearl effect is determined to be generated when a transparent toner is printed in a similar shape and a similar position to a low density color toner. Although the low density indicates a density of approximately 0.3, a density value is not limited thereto. A threshold density may be set by a user in advance within a range that can permit the pearl effect.

[Difference in Visual Effects of Pearl Effect According to Print Methods]

The pearl effect can be achieved when CMYK toners serving as color toners and a transparent toner are evenly heated and mixed during a fixing process in an image forming apparatus. When the pearl effect is to be achieved, therefore, an application of the "1-pass printing" can provide a greater visual effect since the "1-pass printing" completes the printing by transferring and fixing the CMYK toners and the transparent toner at once.

In the "2-pass printing", on the other hand, the image forming apparatus A 102 transfers and fixes the CMYK toners, and then the image forming apparatus B 103 transfers and fixes the transparent toner 405 to complete the printing. Consequently, all the toners are not evenly heated, and the CMYK toners and the transparent toner cannot be evenly mixed. An application of the "2-pass printing", therefore, may lower the visual effect of the pearl effect.

[Overview of Print System]

FIG. 2 illustrates a configuration of the image forming apparatus A 102 and the image forming apparatus B 103. The image forming apparatus A 102 includes a reception unit 201, a user interface (UI) unit 202, a data processing unit 203, and a print output unit 204. The image forming apparatus B 103 includes a reception unit 205, a UI unit 206, a data processing unit 207, and a print output unit 208.

Figure 3:
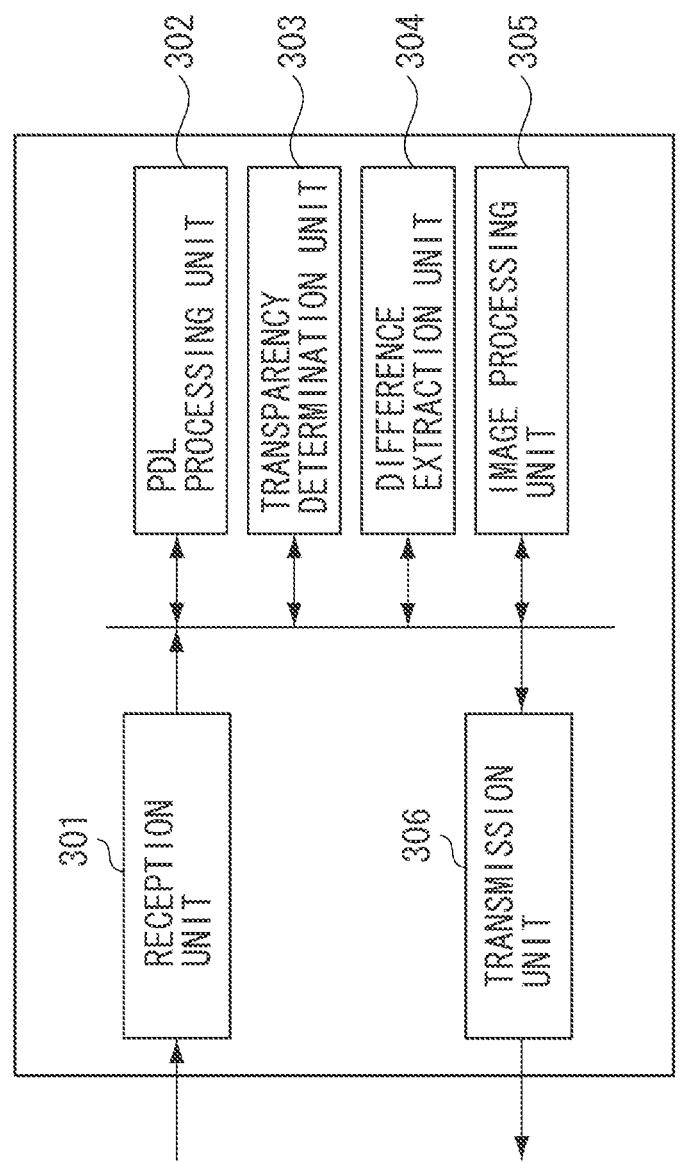
FIG. 3 is a block diagram illustrating a configuration of a data processing unit.

FIG. 3 illustrates a configuration of the data processing units 203 and 207 each of which includes a reception unit 301, a page description language (PDL) processing unit 302, a transparency determination unit 303, a difference extraction unit 304, an image processing unit 305, and a transmission unit 306.

Figure 7:
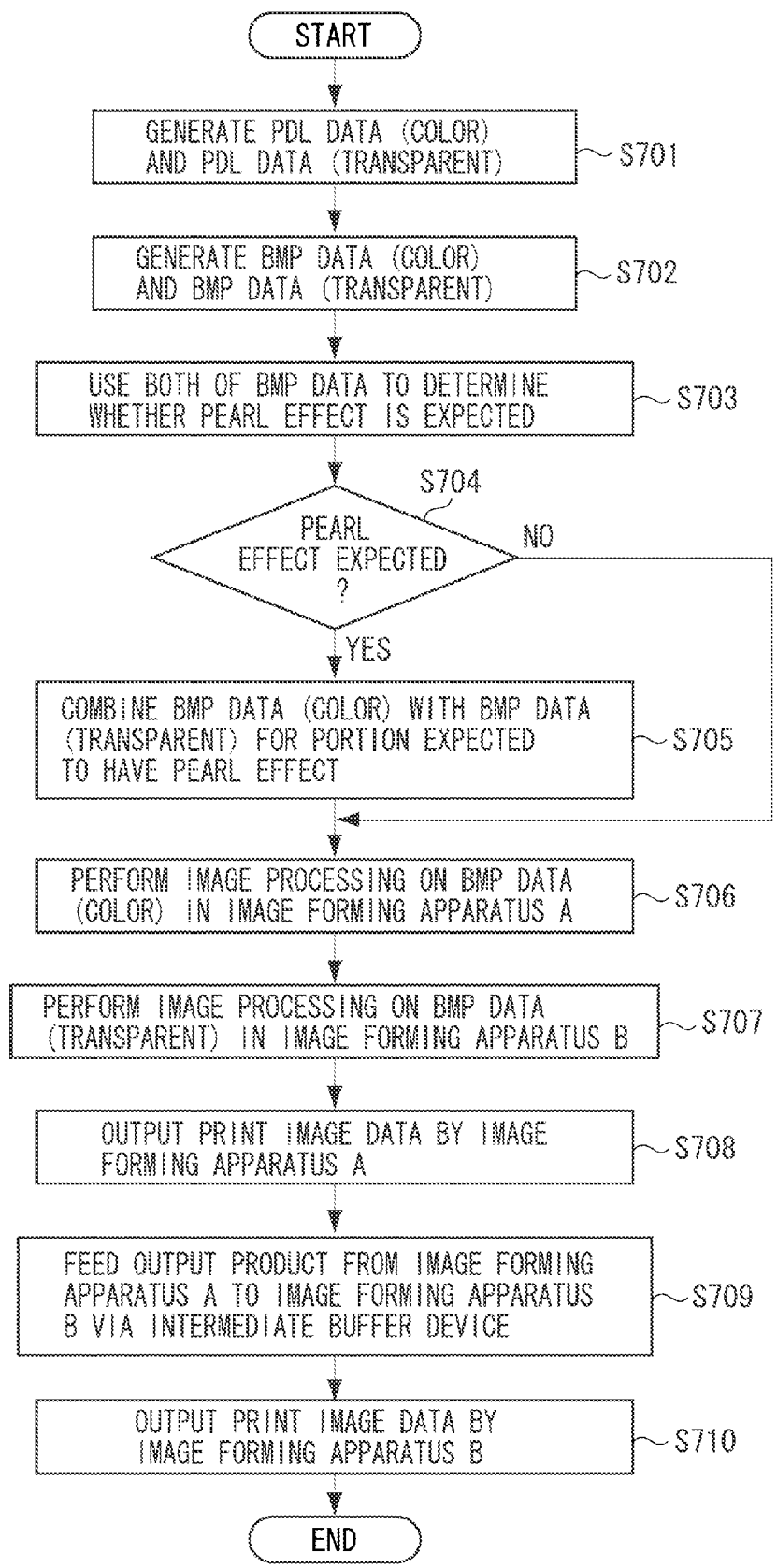
FIG. 7 is a flowchart illustrating a procedure to be performed according to a first exemplary embodiment.

FIG. 7 is a flowchart illustrating a procedure to be performed by the components 301 through 306 of each of the data processing units 203 and 207. A program code for realizing each step in the flowchart is stored in the respective image forming apparatuses A 102 and B 103, and is executed by central processing units (CPU) (not shown) included in the respective image forming apparatuses A 102 and B 103.

Figure 8A:
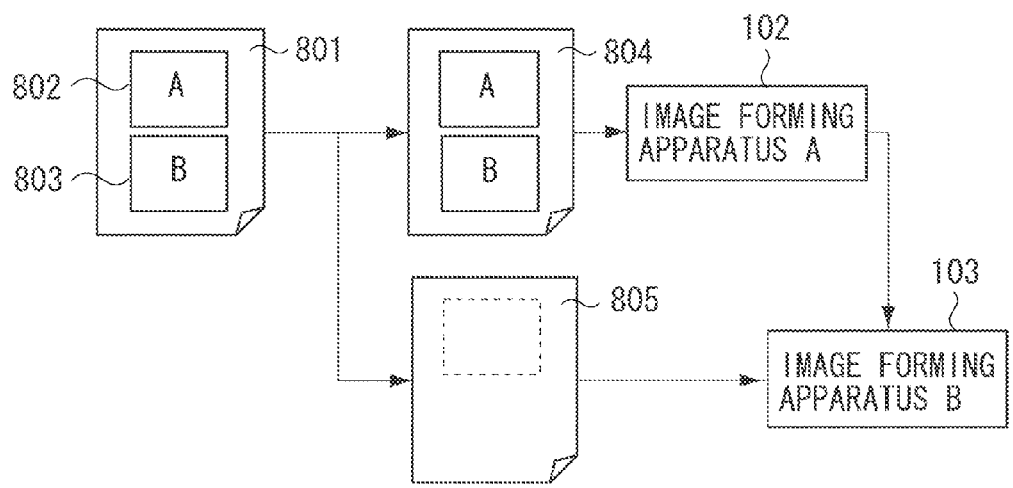
FIGS. 8A and 8B each illustrate a method for dividing bit map data according to a difference extraction unit.
Figure 8B:
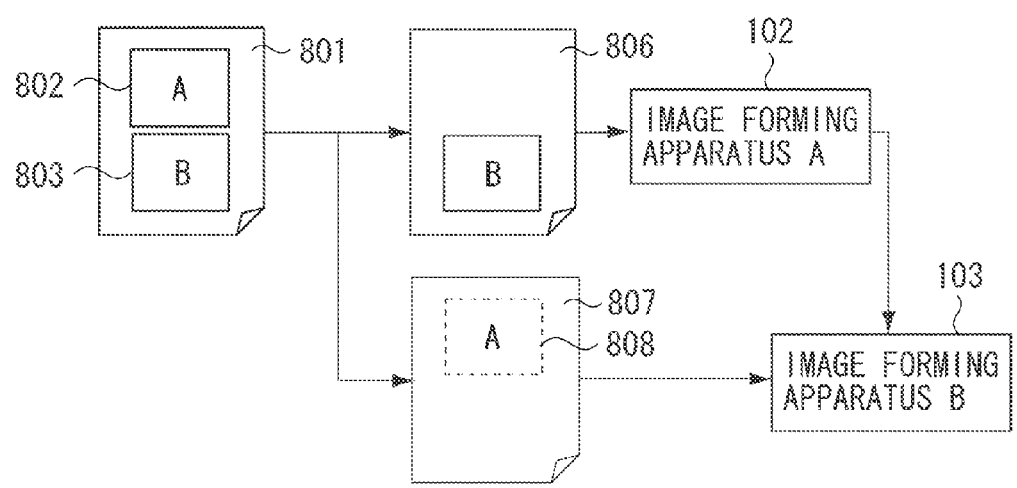

FIGS. 8A and 8B each illustrate bit map data that changes according to whether the difference extraction unit 304 expects a pearl effect.

In step S701, the reception unit 301 receives printer driver data transmitted from a printer driver inside the host computer 106. The PDL processing unit 302 analyzes the received printer driver data, extracts an area designated to be printed with a transparent toner, and divides data into color data to be printed with color toners and transparent data to be printed with the transparent toner, so that each of PDL data is generated.

In step S702, the PDL processing unit 302 rasterizes each of the PDL data pieces and generates bit map data for the color data and bit map data for the transparent data.

In step S703, the transparency determination unit 303 uses both of the generated bit map data pieces to determine whether the pearl effect is expected on an output product. A determination process is described in detail below.

In step S704, the transparency determination unit 303 determines that the pearl effect is expected (YES in step S704), the processing proceeds to step S705. In step S705, the difference extraction unit 304 combines the color bit map data with the transparent bit map data for an area expected to have the pearl effect.

For example, it is assumed that a print driver data 801 includes an object 802 and an object 803 as illustrated in FIG. 8A when the present print system 101 prints the print driver data 801. If the transparent toner is to be used in the object 802, while the pearl effect is not expected in this area (NO in step S704), the print driver data 801 is divided into color bit map data 804 and transparent bit map data 805 as illustrated in FIG. 8A.

Whereas if the area of the object 802 is expected to have the pearl effect (YES in step S704), as illustrated in FIG. 8B, the print driver data 801 is divided into color bit map data 806 including only the object 803 and data in which the object 802 is combined with transparent bit map data. Then the transparent bit map data serves as color and transparent bit map data 807 including a new object 808 having color data and transparent data.

In step S706, the image processing unit 305 in the image forming apparatus A 102 performs image processing on the color bit map data only to generate print image data. The image processing includes a gamma process considering a characteristic of the image forming apparatus A 102, a CMYK conversion process if the color bit map data is redgreen-blue (RGB) signal data, a density adjustment process if the color bit map data is CMYK signal data, and an image forming process at the last.

In step S707, the image processing unit 305 in the image forming apparatus B 103 performs image processing on the transparent bit map data 805 or the color and transparent bit map data 807 to generate print image data.

In step S708, in the image forming apparatus A 102, the transmission unit 306 transmits the print image data generated by the image processing unit 305 to the print output unit 204. Upon receipt of the print image data, the print output unit 204 prints out the print image data. In step S709, the output product output in step S708 is fed to the image forming apparatus B 103 via the intermediate buffer device 104.

In step S710, in the image forming apparatus B 103, the transmission unit 306 transmits the print image data generated by the image processing unit 305 in the data processing unit 207 to the print output unit 208. Upon receipt of the print image data, the print output unit 208 prints out the print image data.

[Detail of Transparency Determination Unit 303]

Figure 9:
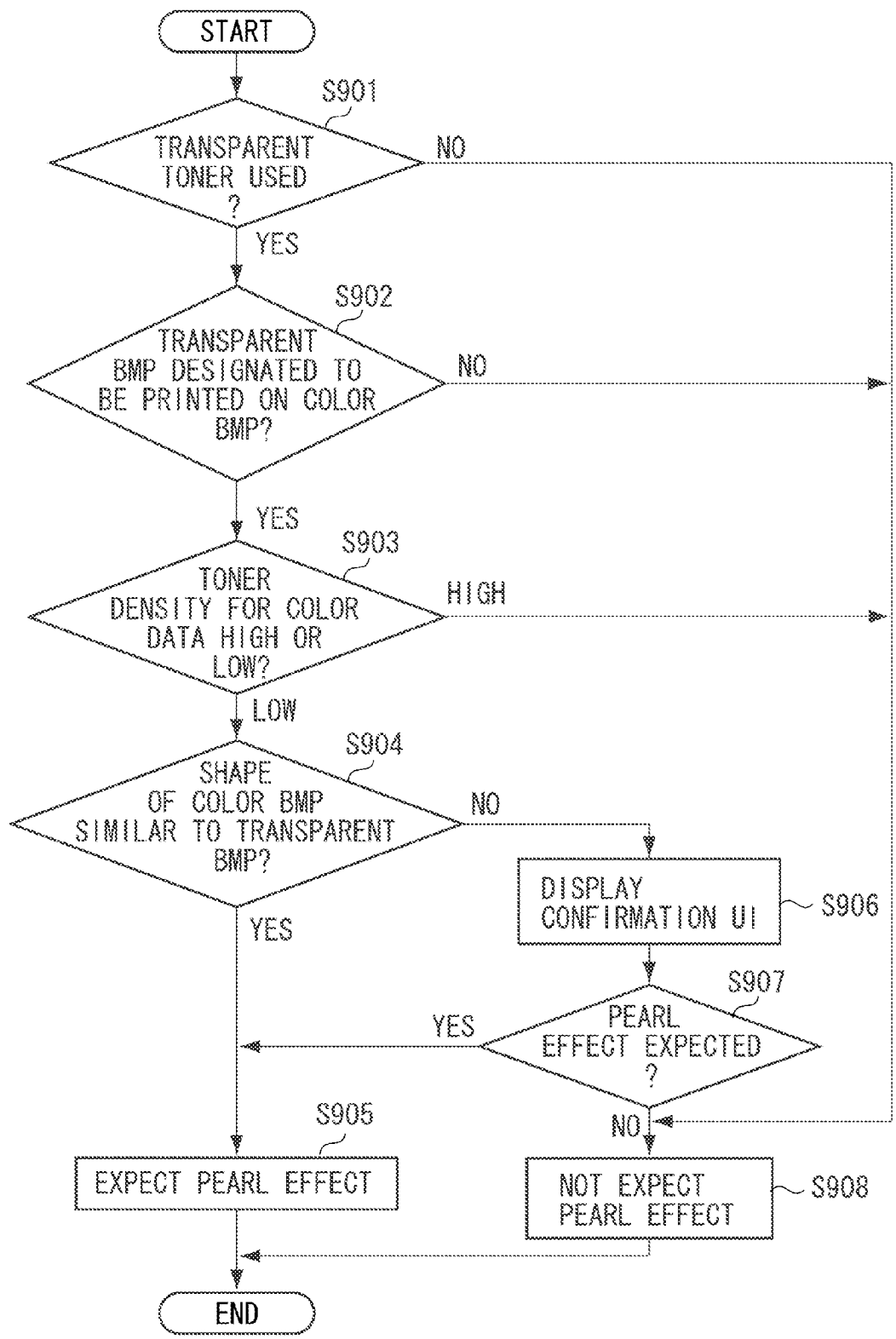
FIG. 9 is a flowchart illustrating a procedure to be performed according to the first exemplary embodiment.

FIG. 9 is a flowchart illustrating a procedure for determining "whether a pearl effect is expected" in step S703 illustrated in FIG. 7. A program code for realizing each step in the flowchart is stored in the image forming apparatus A 102, and is executed by a CPU (not shown) included in the image forming apparatus A 102.

Figure 6:
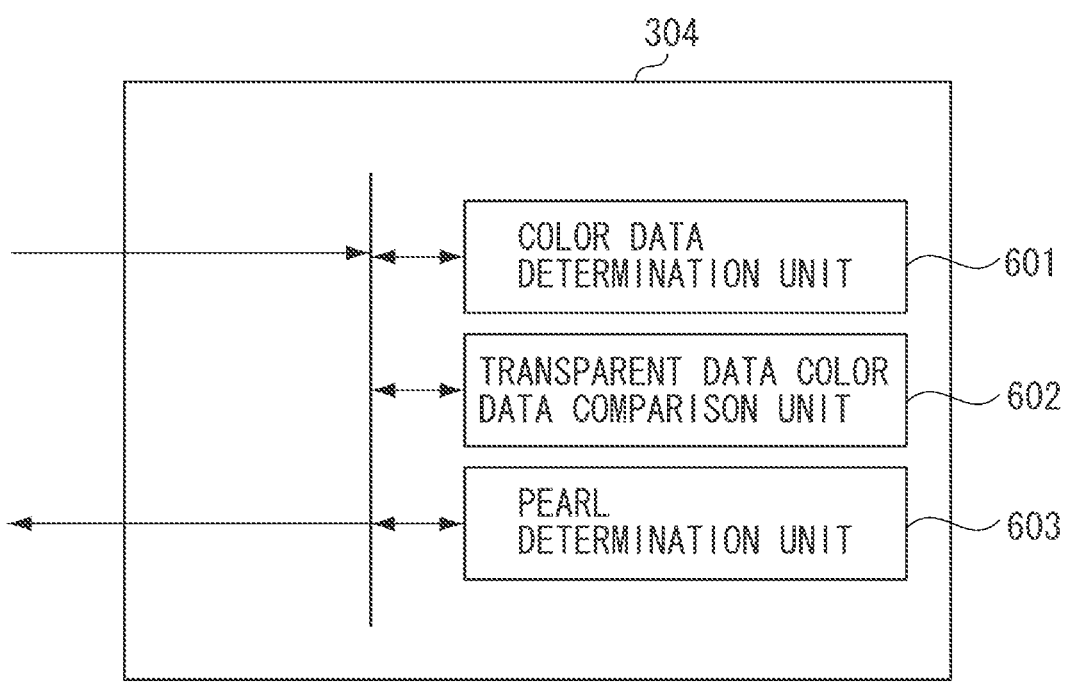
FIG. 6 is a block diagram illustrating a configuration of a transparency determination unit.
Figure 10:
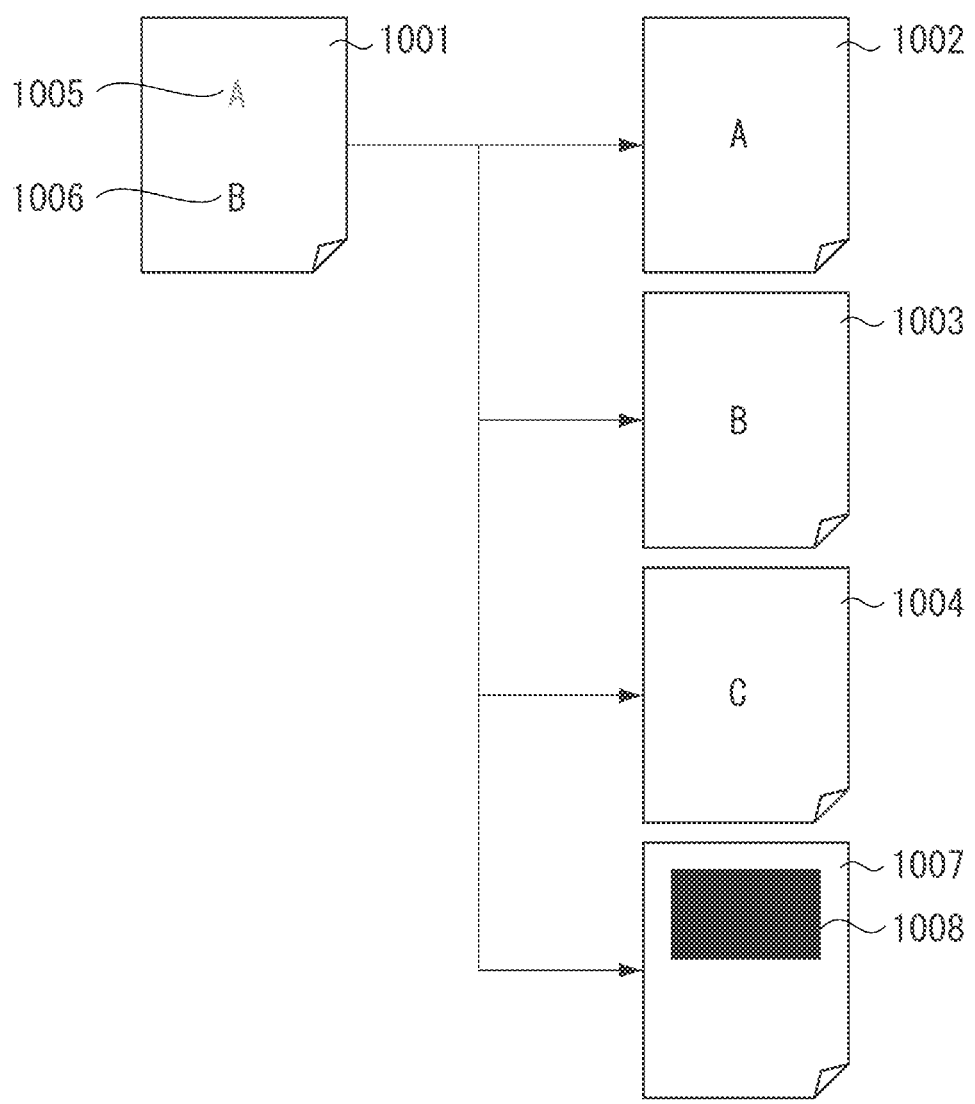
FIG. 10 illustrates a combination of CMYK bit map data and transparent bit map data.
Figure 12:
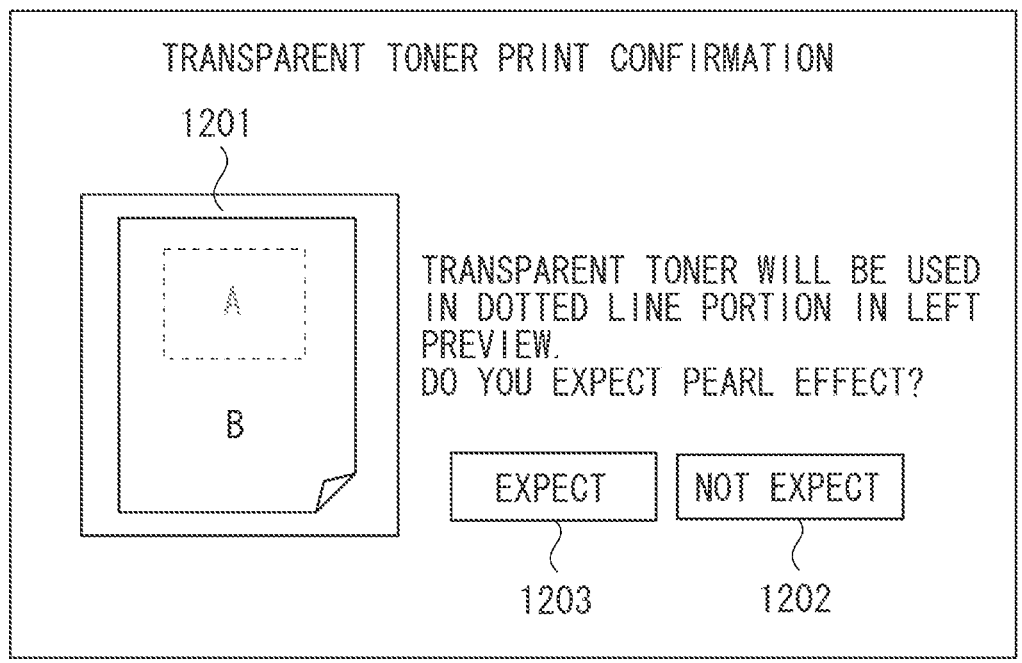
FIG. 12 illustrates an example of a screen to be displayed on a user interface (UI) screen.

FIG. 6 illustrates a configuration of the transparency determination unit 303. The transparency determination unit 303 includes a color data determination unit 601, a transparent data color data comparison unit 602, and a pearl determination unit 603. FIG. 10 illustrates an example for determination of whether a pearl effect is expected. FIG. 12 illustrates an example of a screen to be displayed on the UI unit 202.

In step S901, the transparency determination unit 303 determines whether use of the transparent toner is designated to input (rasterized) image data when the print system 101 performs printing. If the use of the transparent toner is not designated for the printing (NO in step S901), then in step S908, the pearl determination unit 603 determines that the pearl effect is not expected.

Whereas if the use of the transparent toner is designated for the printing (YES in step S901), then in step S902, the color data determination unit 601 determines whether the transparent bit map data is designated to be printed on the color bit map data. If the transparent bit map data is not designated (NO in step S902), the in step S908, the pearl determination unit 603 determines that the pearl effect is not expected.

On the other hand, if the transparent bit map data is designated to be printed on the color bit map data (YES in step S902), then in step S903, the color data determination unit 601 determines whether a toner density for the color data is high or low. If the toner density is high (HIGH in step S903), then in step S908, the pearl determination unit 603 determines that the pearl effect is not expected.

On the other hand, if the toner density is low (LOW in step S903), then in step S904, the transparent data color data comparison unit 602 determines whether the color bit map data has a shape similar to that of the transparent bit map data. More specifically, the transparent data color data comparison unit 602 determines whether the transparent bit map data is set to be printed on the color bit map data.

If the color bit map data and the transparent bit map data are designated to be printed in the similar shape (YES in step S904), then in step S905, the pearl determination unit 603 determines that the pearl effect is expected. On the other hand, if shapes of the two bit map data pieces are not similar (NO in step S904), then in step S906, the pearl determination unit 603 causes the UI unit 202 to display a confirmation screen to a user.

In step S907, the user views the screen on the UI unit 202 as illustrated in FIG. 12, and determines whether to expect the pearl effect based on a preview image displayed in a preview 1201. The user presses a button 1202 or a button 1203. In the preview 1201, an area which is automatically determined that the pearl effect is expected by the image forming apparatus is displayed so that the user can recognize the area. For example, the determined area may be emphasized with a frame border or color.

If the user presses the button 1202 (NO in step S907), then in step S908, the pearl determination unit 603 determines that the user does not expect the pearl effect on the print product. If the user presses the button 1203 (YES in step S907), then in step S905, the pearl determination unit 603 determines that the user expect the pearl effect on the print product.

Such a procedure is now described with reference to FIG. 10. Color bit map data 1001 includes a low density object 1005 and a high density object 1006. If transparent bit map data 1002 corresponds to the color bit map data 1001, the transparent bit map data 1002 is printed with the transparent toner in a similar shape and a similar print position to the low density object 1005. Accordingly, it can be determined that the pearl effect is expected.

If transparent bit map data 1003 corresponds to the color bit map data 1001, the transparent bit map data 1003 is printed with the transparent toner in a similar shape and a similar print position to the high density object 1006. Accordingly, in step S903, it can be determined that the pearl effect is not expected.

Further, if transparent bit map data 1004 corresponds to the color bit map data 1001, the transparent bit map data 1004 does not include an object in need of low density toner in a similar shape and a similar position to the object 1005 or 1006. Accordingly, in step S902, it can be determined that the pearl effect is not expected.

Furthermore, if transparent bit map data 1007 corresponds to the color bit map data 1001, a transparent toner is used in a similar position to the low density object 1005. However, the transparent bit map data 1007 includes an object 1008 having a different shape from the low density object 1005. Thus, in step S906, a confirmation UI is displayed on the screen of the UI unit 202.

Such a determination of whether the pearl effect is expected does not need to be made after data is rasterized into bit map data. Alternatively, a determination of whether the pearl effect is expected may be made when data is in a PDL data state or in an intermediate data (display list) state. The intermediate data is generated before PDL data is rasterized into bit map data.

According to the first exemplary embodiment, therefore, an area in which a user expects a pearl effect expression on a print product is automatically determined, and the printing with a transparent toner can be changed to be perform simultaneously with or independently from the printing with a color toner based on such a determination result.

Therefore, an appropriate printing method is applied to an area expected to be expressed with the pearl effect, so that the pearl effect is effectively provided in the area.

According to the first exemplary embodiment, an area in which transparent bit map data and color bit map data match is determined as a pearl effect-expected area. However, a pattern of a pearl effect once desired by a user may be registered for reuse. In a second exemplary embodiment, a method is described in which a pattern (which is the transparent bit map data) confirmed in step S907 is registered when the transparent bit map data and the color bit map data do not match.

Figure 11:
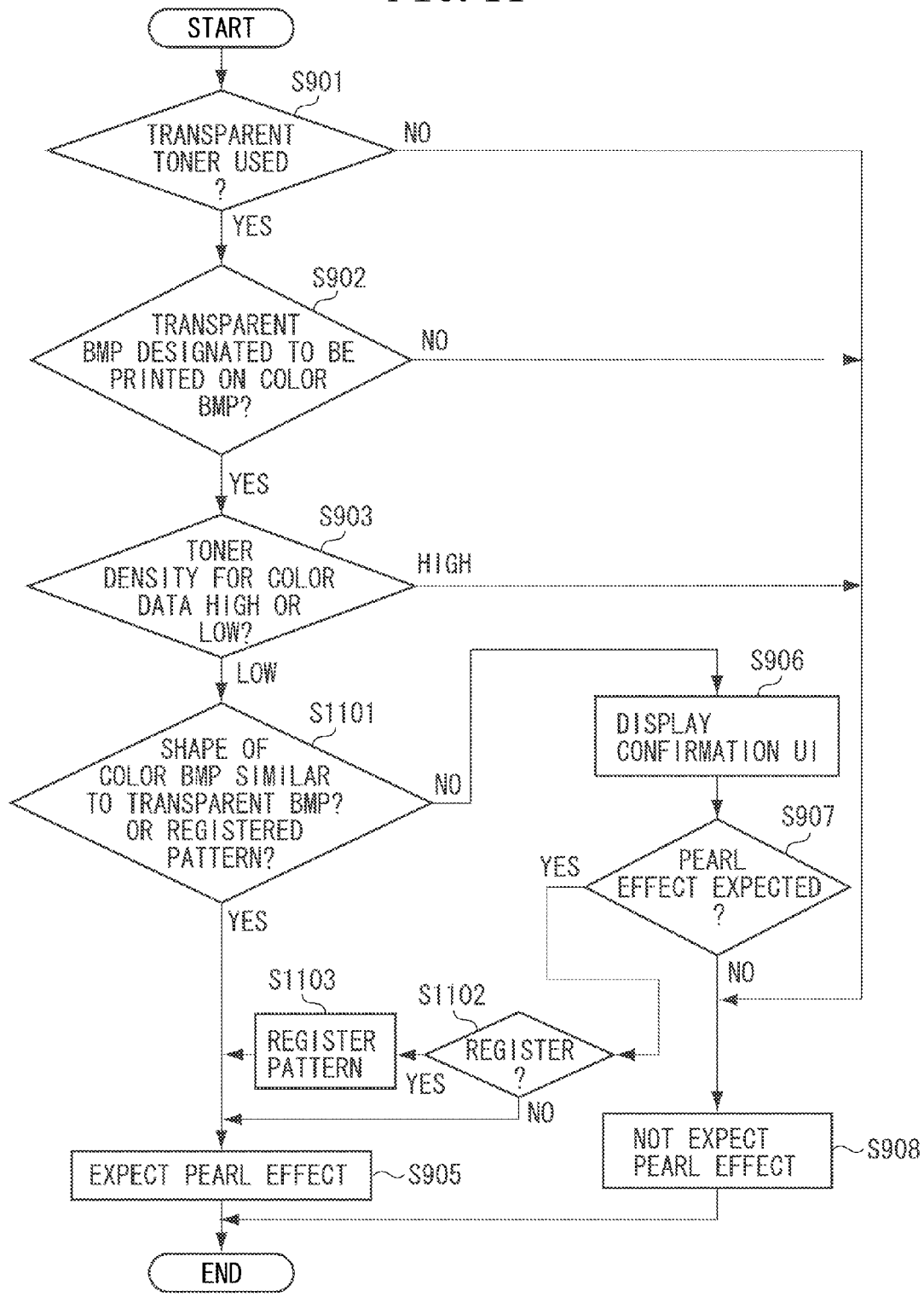
FIG. 11 is a flowchart illustrating a procedure to be performed according to a second exemplary embodiment.

FIG. 11 is a flowchart illustrating a procedure to determine whether the pearl effect is expected in step S703 illustrated in FIG. 7. A program code for realizing each step in the flowchart is stored in the image forming apparatus A 102, and is executed by a CPU (not shown) included in the image forming apparatus A 102. In the present exemplary embodiment, processes in steps S1101 through S1103 are described since those steps are different from the flowchart illustrated in FIG. 9 according to the first exemplary embodiment.

In step S1101, the pearl determination unit 603 determines whether the shape of the color bit map pattern is similar to that of the transparent bit map data. If it is determined that the shape of the color bit map pattern is different from that of the transparent bit map data (NO in step S1101), the processing proceeds to step S906. Further, in step S907, if it is determined that the pearl effect is expected on the transparent bit map data (YES in step S907), the processing proceeds to step S1102.

Figure 14:
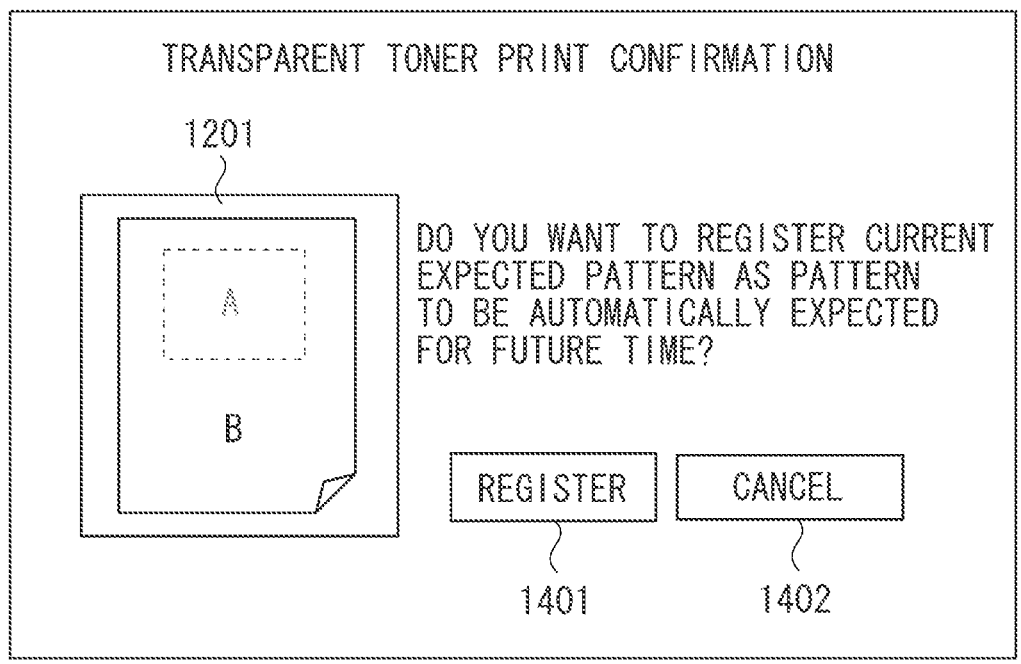
FIG. 14 illustrates an example of a screen to be displayed on a UI screen.

In step S1102, if a user presses a button 1401 illustrated in FIG. 14 (YES in step S1102), then in step S1103, the pearl determination unit 603 stores therein a pearl effect-expected pattern displayed in a preview 1201 of the UI unit 202. More specifically, when the transparent toner is used to an object such as the object 1008 on a character object such as the object 1005 as illustrated in FIG. 10, the pearl determination unit 603 stores therein such a case as a pearl effect-expected pattern.

Such an object is registered as a pearl effect-expected object when printed again.

If a user presses a button 1402 illustrated in FIG. 14 (NO in step S1102), the object is not stored as a pearl effect-expected pattern.

Subsequently, in step S1101, the transparent data color data comparison unit 602 determines whether the color bit map data is a similar shape to the transparent bit map data, or a pattern stored in the pearl determination unit 603.

Such a procedure is now described with reference to FIG. 10. If the color bit map data 1001 corresponds to the transparent bit map data 1007, and the pearl effect is expected (YES in step S907), then in step S1102, the confirmation UI is displayed on the screen of the UI unit 202. Further, if a combination of the object 1005 and the object 1008 is registered as a pearl effect-expected pattern as a result of the user's confirmation, the confirmation UI in step S906 will not be displayed next time even in a case where the transparent bit map data 1007 corresponds to the color bit map data 1001.

[Method for Storing Pattern to Pearl Determination Unit 603]

The pearl determination unit 603 stores therein a pattern according to area sizes of the object 1005 and the object 1008 and a positional relationship of these objects. It is assumed that the object 1005 is color data, and the object 1008 is transparent data. First, the pearl determination unit 603 determines an area of the object 1005 by generating a rectangle for the object 1005 and defining such a rectangular area as the size of the object 1005. The pearl determination unit 603 generates a rectangle for the object 1008 and defines such a rectangular area as a size of the object 1008. Then, the pearl determination unit 603 calculates a ratio between sizes of the object 1005 and the object 1008.

Second, the pearl determination unit 603 determines a positional relationship of the objects 1005 and 1008 as follows. The pearl determination unit 603 acquires coordinate data of the object 1005, i.e., the color data. The pearl determination unit 603 acquires coordinate data of the object 1008, i.e., the transparent data. The pearl determination unit 603 stores therein a position of the object having a smaller size relative to a position of the object having a larger size based on the sizes determined earlier.

The pearl determination unit 603, therefore, stores therein the pattern based on the sizes of the objects and the positional relationship between the objects.

Accordingly, when a user registers the pattern which has once been expected to have a pearl effect, a confirmation is not necessary for future times.

According to the above first exemplary embodiment, the image forming apparatus B 103 for printing with a transparent toner does not have limitations. However, there are cases where the image forming apparatus B 103 has limitation. A third exemplary embodiment describes limitations of the image forming apparatus B 103 using an example case where the image forming apparatus B 103 is a one-drum type image forming apparatus, and another example case where the image forming apparatus B 103 includes a black (K) toner and a transparent toner only.

A one-drum type image forming apparatus represents a printer which forms a latent image corresponding to one toner on a photosensitive drum during one rotation of the drum, and transfers one color toner. For example, when toner images of five components such as C, M, Y, K, and transparent toners are formed, a latent image corresponding to one of the toners is formed during each rotation of the photosensitive drum, and is then developed with corresponding color toner. Therefore, when the toner images of five components are formed, the photosensitive drum makes five rotations. This group of the toner images is transferred to a sheet and is fixed on to the sheet at once, so that the five component toners can be printed.

If the image forming apparatus B 103 is a one-drum type image forming apparatus, a time necessary to print only a transparent toner is a time needed for a drum to make one rotation. However, when CMYK toners are used in addition to the transparent toner, the drum needs to make five rotations in total, so that the image forming apparatus B 103 has limitation that extra time may be consumed compared to use of the transparent toner only.

If the image forming apparatus B 103 is a monochrome machine with a transparent toner cartridge added thereto, such an image forming apparatus B 103 has limitation that the pearl effect cannot be obtained except for a combination of a black toner and the transparent toner.

Figure 13:
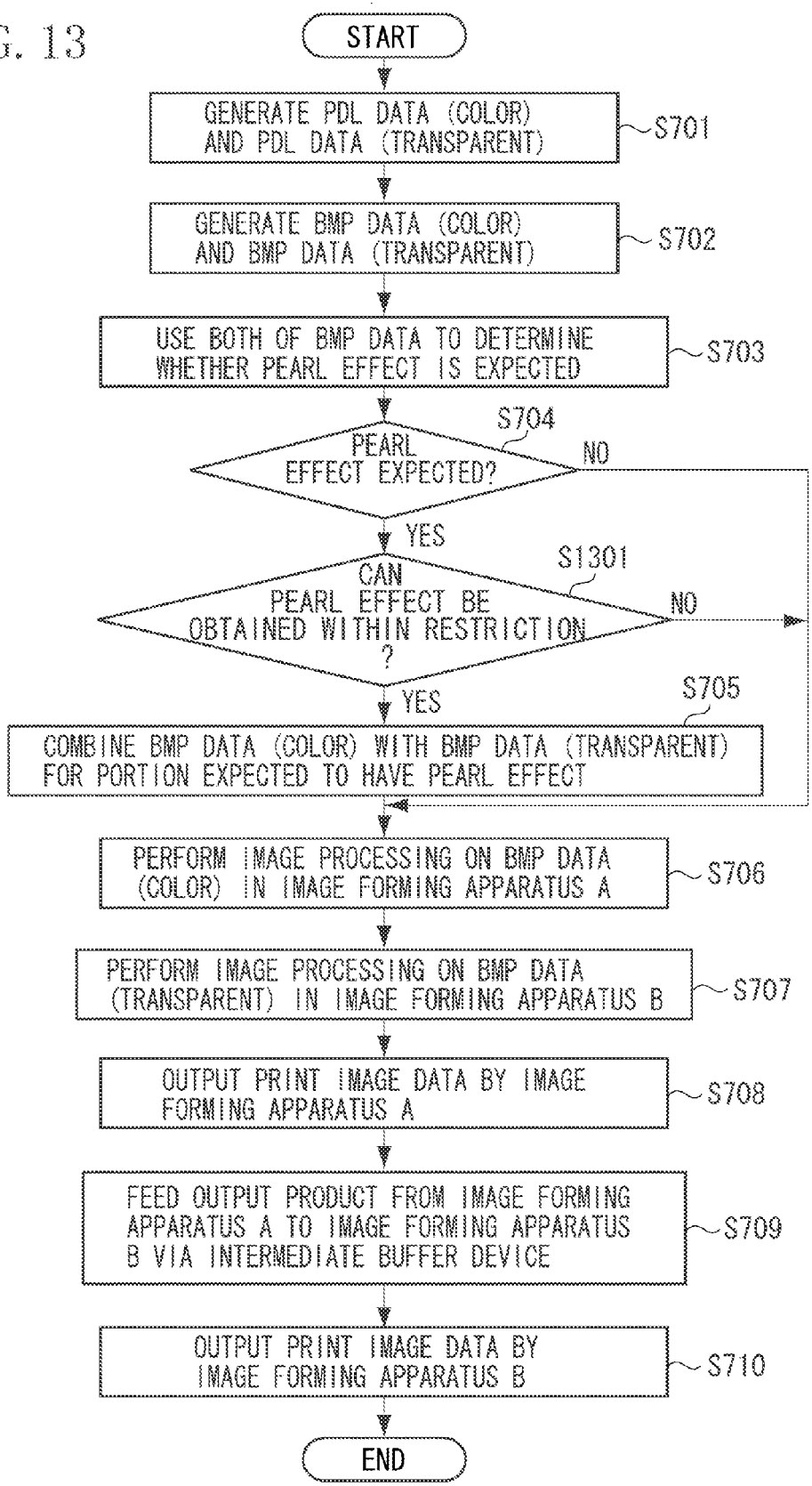
FIG. 13 is a flowchart illustrating a procedure to be performed according to a third exemplary embodiment.

FIG. 13 is a flowchart illustrating a procedure to be performed by components 301 through 306 of each of data processing units 203 and 207 according to the third exemplary embodiment. In the present exemplary embodiment, a process in step S1301 is described since the step is different from the flowchart illustrated in FIG. 7 according to the first exemplary embodiment. A program code for realizing each step in the flowchart is stored in the respective image forming apparatuses A 102 and B 103, and is executed by central processing units (CPU) (not shown) included in the respective image forming apparatuses A 102 and B 103.

FIG. 15 illustrates an example of a screen to be displayed on the UI unit 202.

In step S 1301, the transparency determination unit 303 determines whether the pearl effect can be obtained even when the image forming apparatus B 103 has limitation. For example, if the image forming apparatus B 103 is a one-drum type image forming apparatus, the UI unit 202 displays a screen illustrated in FIG. 15. If a button 1501 displayed on the screen in the UI unit 202 is pressed, the transparency determination unit 303 determines that speed is prioritized. Since printing using the color toners and the transparent toner consumes time as described above, the image forming apparatus B 103 performs printing with the transparent toner only.

On the other hand, if a button 1502 is pressed, an image quality is prioritized. The image forming apparatus B 103 thus performs printing with the color toners and the transparent toner such that the pearl effect can be provided effectively although the printing may consume time.

In another example, if the image forming apparatus B 103 includes only a black toner and a transparent toner, the pearl effect can be expressed by the black toner and the transparent toner. However, the pearl effect cannot be expressed by the transparent toner and the other toners such as CMY toners.

Accordingly, in step S1301, the transparency determination unit 303 determines the toner color to be used to print the color bit map data with the transparent bit map data. If the toner color to be used is black, the pearl effect can be expressed. More specifically, if the black toner is used (YES in step S1301), the processing proceeds to step S705.

Whereas if the toner colors to be used are CMY, the pearl effect cannot be expressed while the printing can be performed with the transparent toner only. More specifically, if the CMY toners are used (NO in step S1301), the processing proceeds to step S706.

As described above, according to the present exemplary embodiment, if the image forming apparatus for performing printing with the transparent toner has limitation, the pearl effect can be maximized while the limitation is being considered.

The first through third exemplary embodiments are described with two image forming apparatuses. Alternatively, each of the exemplary embodiments may be applied to one image forming apparatus capable of performing printing with CMYK toners serving as color toners and a transparent toner.

For example, it is assumed that the image forming apparatus B 103 operates independently, and the pearl determination unit 603 included in the image forming apparatus B 103 can determine whether an area within image data is a pearl effect-expected area.

If the area within the input image data is determined as a pearl effect-expected area, the image forming apparatus B 103 transfers color toners and the transparent toner to a sheet and fixes the toners to the sheet at once. The image forming apparatus B 103 may perform printing on the other area on a sheet simultaneously with the pearl effect-expected area, or the other areas may be printed by another apparatus. Alternatively, a sheet having been printed may be fed to the image forming apparatus B 103 again to print image data of the other areas that differ from a previously printed area on the sheet.

More specifically, if it is determined that a pearl effect-expected area is present in image data in the case where the 2-pass printing is set to perform printing with the transparent toner, the area is printed by a 1-pass printing with the transparent toner regardless of the setting of 2-pass printing. In this case, an area other than the pearl effect-expected area may be printed with the transparent toner by the 2-pass printing.

According to the above exemplary embodiments, a density of a color recording agent to be used for an area is used to determine whether the area is a pearl effect-expected area. Alternatively, a lightness may be used for determination. In such a case, an area having a higher lightness than a predetermined threshold is determined to be a pearl effect-expected area.

The above descriptions are made on an example case where a toner is used as a recording agent. However, for example, a solid ink may be used as a recording agent.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-058104 filed Mar. 16, 2011, which is hereby incorporated by reference herein in its entirety.

What is claimed is:

1. An image forming apparatus comprising:
  a determination unit configured to determine whether printing is designated to be performed using a transparent recording toner with respect to an area to be printed with a color recording toner having a density lower than a threshold among areas included in input image data; and
  a printing unit configured to perform printing by transferring the color recording toner and the transparent recording toner to a sheet and fixing the color recording toner and the transparent recording toner to the sheet by a single fixing process to form an image of the area if the determination unit determines that the printing is designated to be performed using the transparent recording toner with respect to the area to be printed with the color recording toner having the density lower than the threshold.

2. The image forming apparatus according to claim 1, wherein, among the areas included in the input image data, an area which is designated to be printed with the transparent recording toner and is not printed using the single fixing process by the printing unit is printed using a fixing process which is different from the fixing process performed by the printing unit.

3. The image forming apparatus according to claim 1, further comprising:
  a separation unit configured to separate the area determined by the determination unit to be designated to be printed with the transparent recording toner with respect to the area to be printed with the color recording toner having the density lower than the threshold from the image data;
  a first printing unit configured to perform printing of image data including the area separated from the image data by the separation unit by transferring the color recording toner and the transparent recording toner thereto and fixing the color recording toner and the transparent recording toner by the single fixing process; and
  a second printing unit configured to complete printing of remaining image data from which the area is separated by the separation unit by transferring the color recording toner thereto, fixing the color recording toner, transferring the transparent recording toner thereto, and fix the transparent recording toner again.

4. The image forming apparatus according to claim 3, wherein, if the second printing unit performs printing, the color recording toner is transferred and fixed by a first image forming apparatus and the transparent recording toner is transferred and fixed by a second image forming apparatus which is different from the first image forming apparatus, and wherein a sheet discharge unit of the first image forming apparatus and a sheet feeding unit of the second image forming apparatus are connected.

5. The image forming apparatus according to claim 1, further comprising:

a comparison unit configured to compare a shape of the area to be printed with the color recording toner having the density lower than the threshold and a shape of an area designated to be printed with the transparent recording toner; and a confirmation unit configured to display the area designated to be printed with the transparent recording toner on a screen if the shapes are determined to be different as a result of the comparison by the comparison unit, and to confirm whether to complete the printing by transferring the color recording toner and the transparent recording toner to the sheet with respect to the area designated to be printed with the transparent recording toner and the area to be printed with the color recording toner having the density lower than the threshold and fixing the sheet by the single fixing process.

6. The image forming apparatus according to claim 1, wherein an image of which printing is completed by transferring the color recording toner and the transparent recording toner and fixing by the single fixing process is registered in advance.

7. The image forming apparatus according to claim 1, wherein, if the determination unit makes determination, the area to be printed by transferring the color recording toner and the transparent recording toner to the sheet and fixing the sheet by the single fixing process among the input image data is displayed in a discriminable manner.

8. A method for controlling an image forming apparatus, the method comprising:

determining whether printing is designated to be performed using a transparent recording toner with respect to an area to be printed with a color recording toner having a density lower than a threshold among areas included in input image data; and if it is determined that the printing is designated to be performed using the transparent recording toner with respect to the area to be printed with the color recording toner having the density lower than the threshold, performing a printing operation by transferring the color recording toner and the transparent recording toner to a sheet and fixing the recording toners to the sheet by a single fixing process to form an image of the area.

9. The method according to claim 8, wherein, among the areas included in the input image data, an area which is designated to be printed with the transparent recording toner and is not printed by the single fixing process in the printing operation is printed using a fixing process which is different from the fixing process performed by the printing operation.

10. The method according to claim 8, further comprising:

separating the area determined to be designated to be printed with the transparent recording toner with respect to the area to be printed with the color recording toner having the density lower than the threshold from the input image data;

performing a first printing operation for printing of image data including the area separated from the image data by transferring the color recording toner and the transparent recording toner thereto and fixing the color recording toner and the transparent recording toner by the single fixing process; and performing a second printing operation for completing printing of remaining image data from which the area is separated by transferring the color recording toner thereto, fixing the color recording toner, transferring the transparent recording toner thereto, and fix the transparent recording toner again.

11. The method according to claim 10, wherein, if the second printing operation is performed, the color recording toner is transferred and fixed by a first image forming apparatus and the transparent recording toner is transferred and fixed by a second image forming apparatus which is different from the first image forming apparatus, and wherein a sheet discharge unit of the first image forming apparatus and a sheet feeding unit of the second image forming apparatus are connected.

12. The method according to claim 8, further comprising:

comparing a shape of the area to be printed with the color recording toner having the density lower than the threshold and a shape of an area designated to be printed with the transparent recording toner; and displaying the area designated to be printed with the transparent recording toner on a screen if the shapes are determined to be different as a result of the comparison and confirming whether to complete the printing by transferring the color recording toner and the transparent recording toner to the sheet with respect to the area designated to be printed with the transparent recording toner and the area to be printed with the color recording toner having the density lower than the threshold and fixing the sheet by the single fixing process.

13. The method according to claim 8, wherein an image of which printing is completed by transferring the color recording toner and the transparent recording toner and fixing by the single fixing process is registered in advance.

14. The method according to claim 8, wherein, if determination is made, the area to be printed by transferring the color recording toner and the transparent recording toner to the sheet and fixing the sheet by the single fixing process among the input image data is displayed in a discriminable manner.

15. An image forming apparatus, comprising:

a setting unit configured to set, if an image as a print target is printed, such that a sheet processed by a first printing process for transferring and fixing the image with a color recording toner is processed by a second printing process for transferring and again fixing the image with a transparent recording toner; and a detection unit configured to detect an area in which a density of the color recording toner to be fixed by the first printing process is lower than a threshold, wherein the area detected by the detection unit is processed by transferring and fixing the image with the transparent recording toner in addition to the color recording toner regardless of the setting if the first printing process is performed.

16. A method for controlling an image forming apparatus, the method comprising:

setting, if an image as a print target is printed, such that a sheet processed by a first printing process for transferring and fixing the image with a color recording toner is processed by a second printing process for transferring and again fixing the image with a transparent recording toner; and detecting an area in which a density of the color recording toner to be fixed by the first printing process is lower than a threshold, wherein the detected area is processed by transferring and fixing the image with the transparent recording toner in addition to the color recording toner regardless of the setting if the first printing process is performed.

17. A non-transitory computer readable storage medium storing a program for causing a computer to execute a method according to claim 8.

* * * * *